(12) United States Patent
Schivalocchi

(10) Patent No.: US 10,821,504 B2
(45) Date of Patent: Nov. 3, 2020

(54) PISTON FOR DIE CASTING MACHINE

(71) Applicant: CPR SUISSE S.A., Lugano (CH)

(72) Inventor: Chiara Schivalocchi, Lugano (CH)

(73) Assignee: CPR SUISSE S.A., Lugano (CH)

( * ) Notice: Subject to any disclaimer, the term of this patent is extended or adjusted under 35 U.S.C. 154(b) by 0 days.

(21) Appl. No.: 16/328,540

(22) PCT Filed: Aug. 28, 2017

(86) PCT No.: PCT/IB2017/055154
§ 371 (c)(1),
(2) Date: Feb. 26, 2019

(87) PCT Pub. No.: WO2018/042308
PCT Pub. Date: Mar. 8, 2018

(65) Prior Publication Data
US 2019/0176226 A1   Jun. 13, 2019

(30) Foreign Application Priority Data

Aug. 29, 2016   (IT) .................... 102016000087839

(51) Int. Cl.
*B22D 17/20*   (2006.01)
*F16J 1/00*   (2006.01)
*F16J 15/34*   (2006.01)

(52) U.S. Cl.
CPC ............ *B22D 17/203* (2013.01); *F16J 1/006* (2013.01); *F16J 15/3448* (2013.01)

(58) Field of Classification Search
CPC ... B22D 17/203; F16J 1/006; F16J 1/09; F16J 15/3448
See application file for complete search history.

(56) References Cited

U.S. PATENT DOCUMENTS

| | | | | |
|---|---|---|---|---|
| 4,886,107 A * | 12/1989 | Zecman | ............... | B22D 17/203 164/113 |
| 6,745,820 B2 * | 6/2004 | Schivalocchi | ....... | B22D 17/203 164/113 |
| 7,900,552 B2 * | 3/2011 | Schivalocchi | ....... | B22D 17/203 92/186 |
| 9,523,430 B2 * | 12/2016 | Schivalocchi | ....... | B22D 17/203 |
| 9,835,150 B2 * | 12/2017 | Schivalocchi | ....... | B22D 17/203 |

FOREIGN PATENT DOCUMENTS

| | | |
|---|---|---|
| EP | 1197279 A2 | 4/2002 |
| JP | H0970654 A | 3/1997 |
| WO | 2009125437 A1 | 10/2009 |
| WO | 2013156824 A1 | 10/2013 |

* cited by examiner

*Primary Examiner* — Michael Leslie
(74) *Attorney, Agent, or Firm* — Arent Fox LLP; Michael Fainberg

(57) ABSTRACT

A piston head for a die-casting machine, in particular a cold chamber type, comprises a front surface for pushing the molten metal and a side wall extending around a head axis, wherein at least one ring seat is provided in said side wall suitable to receive a sealing ring. The bottom of the ring seat is connected to the front surface through holes or connection channels for a metal flow under the sealing ring. The holes or connection channels lead into an annular peripheral portion of said front surface, said annular peripheral portion being inclined with respect to a front plane orthogonal to said head axis so as to be turned towards said head axis.

14 Claims, 14 Drawing Sheets

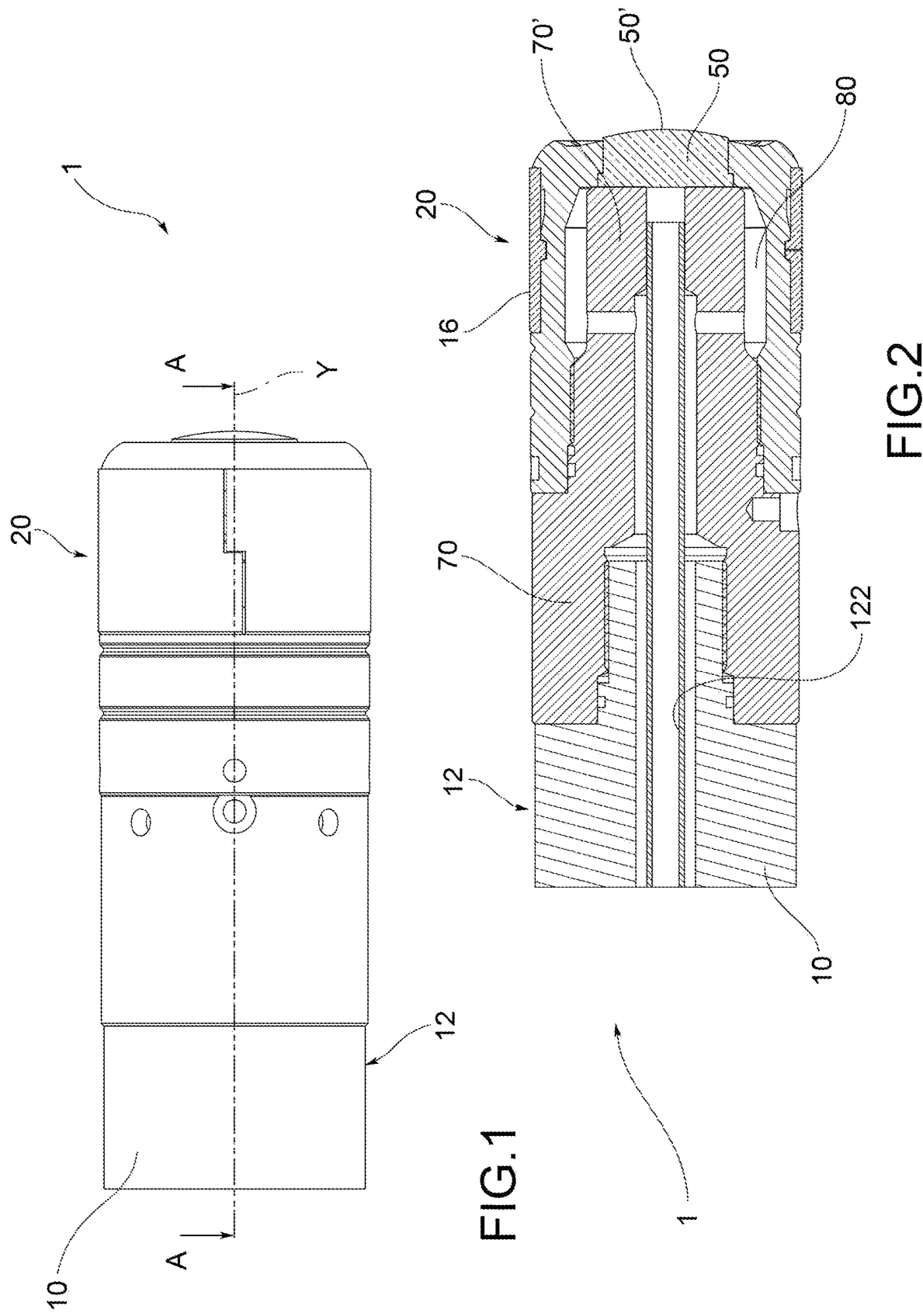

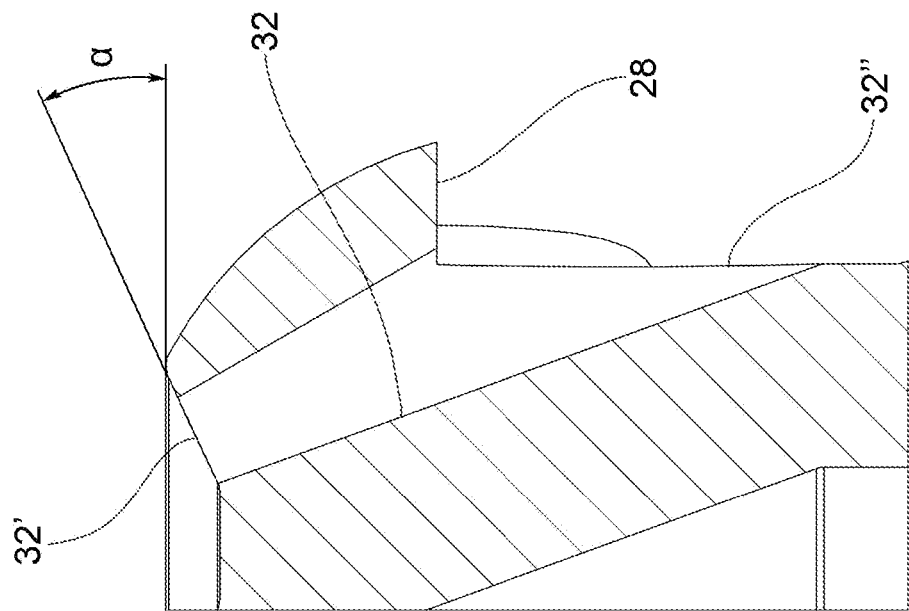
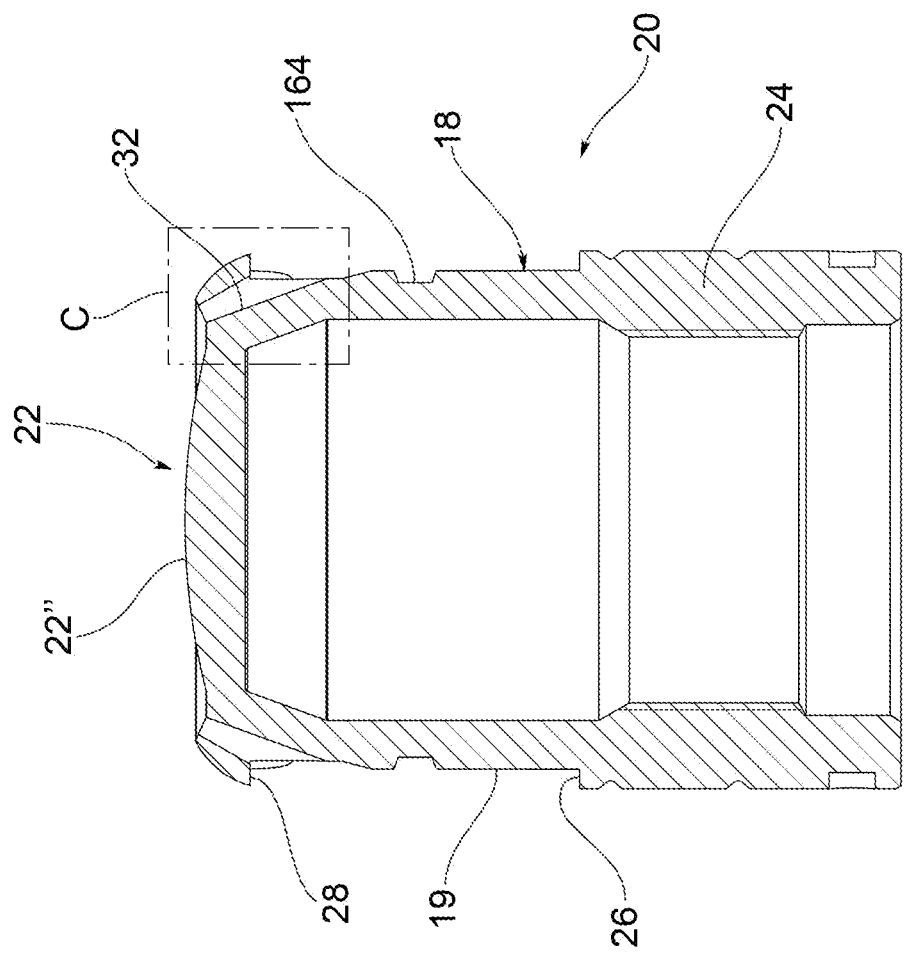
FIG.5a
FIG.5

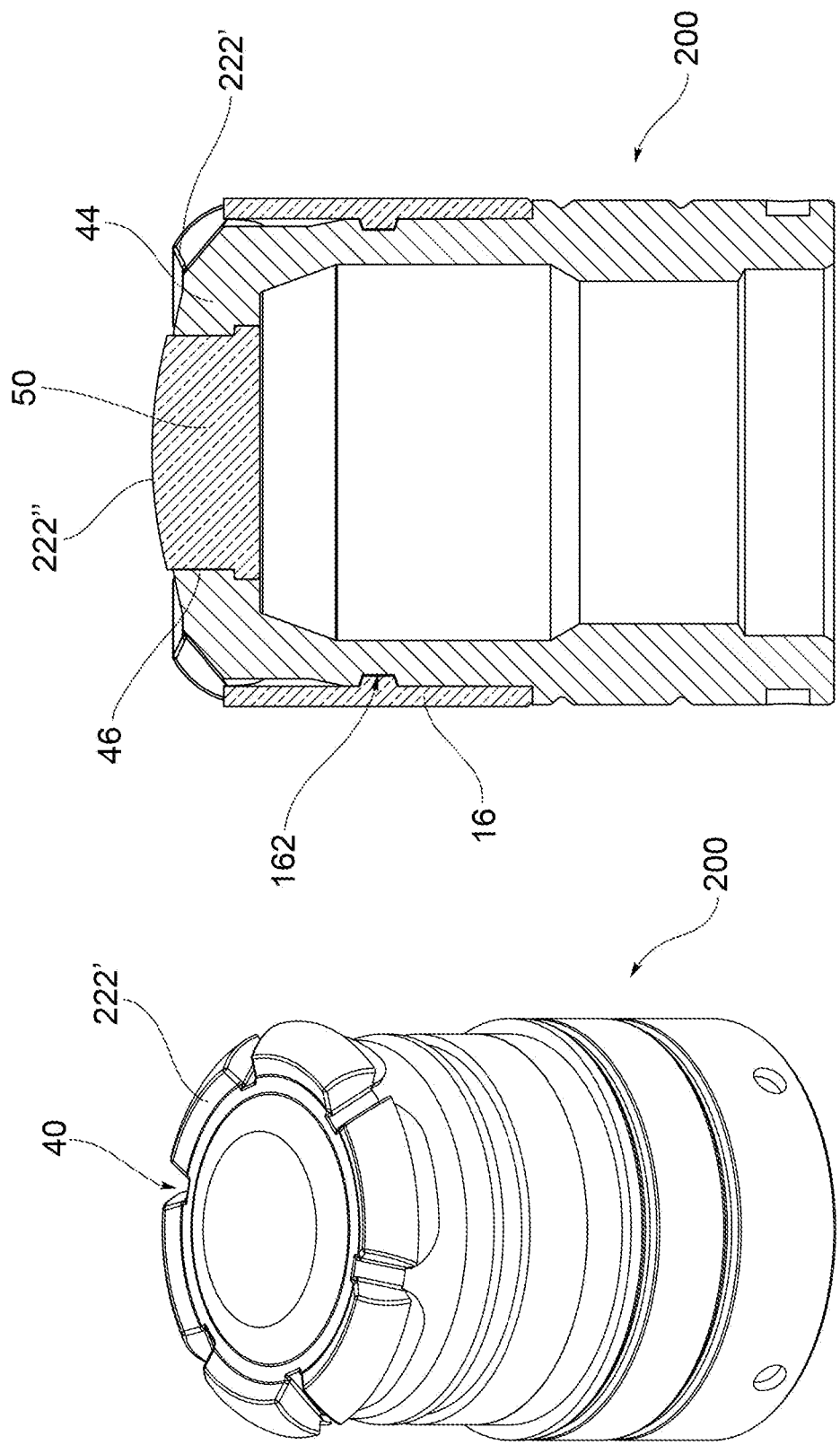

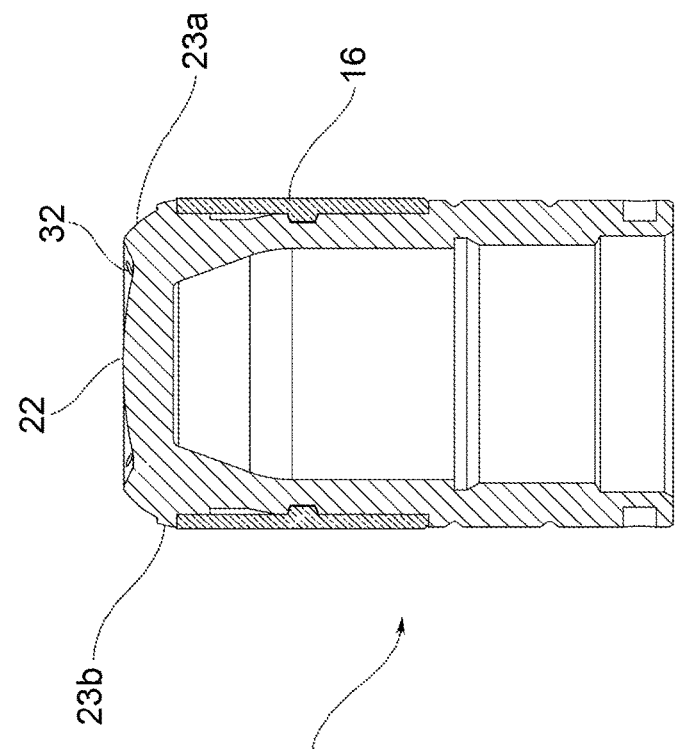
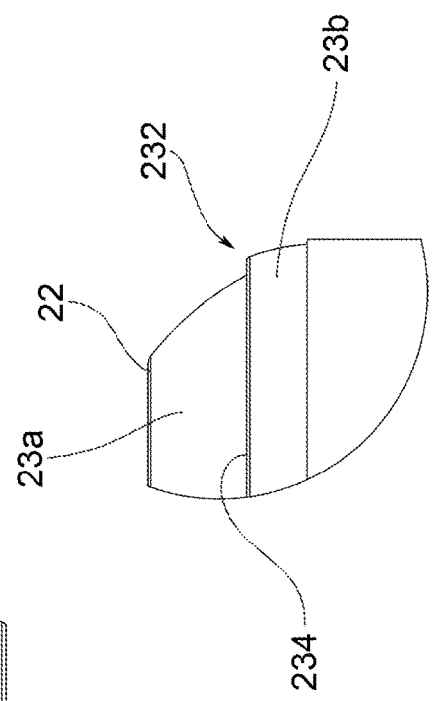
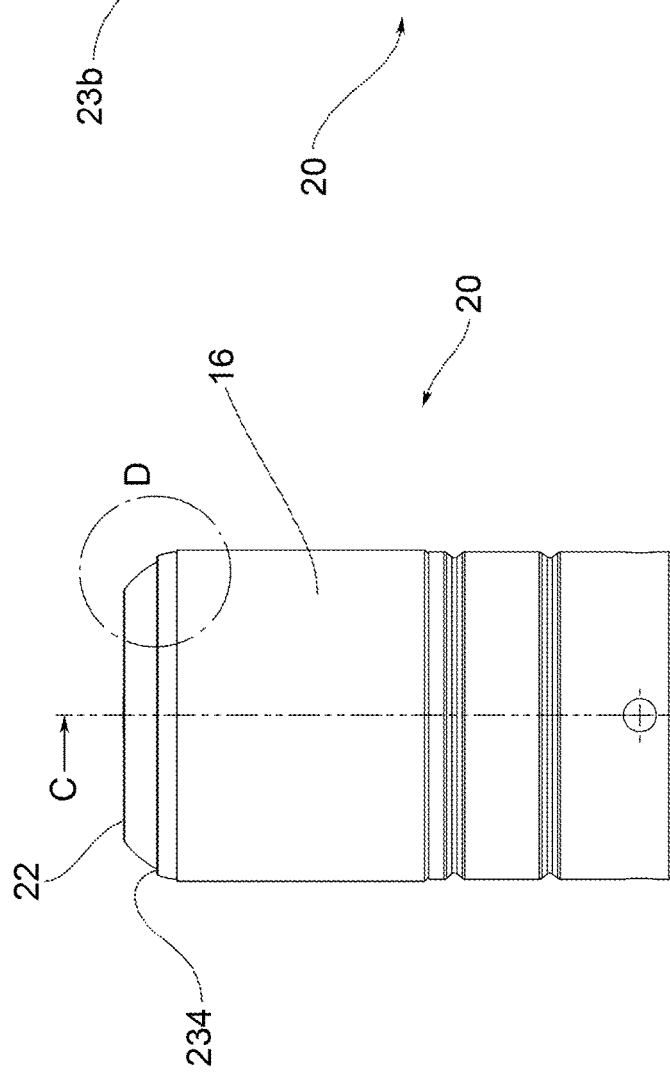

PISTON FOR DIE CASTING MACHINE

CROSS-REFERENCE TO RELATED APPLICATIONS

This application is the U.S. National Stage Application of International Patent Application No. PCT/IB2017/055154, filed on Aug. 28, 2017, which claims priority to Italian Patent Application No. 102016000087839, filed on Aug. 29, 2016, the contents of each of which is incorporated herein by reference in its entirety.

DESCRIPTION

Field of Technology

The present invention relates to die casting machines and in particular refers to a piston of a press for cold chamber die casting. More specifically, the invention concerns a head of such piston.

BACKGROUND OF THE INVENTION

In cold chamber die casting machines, it is known to use injection pistons having a steel or copper head provided with at least one sealing ring.

EP1197279 describes a piston for cold chamber die casting machines comprising a steel body having a head provided with at least one copper alloy sealing ring placed in a respective seat positioned rearwardly relative to the end wall of the head, and where at least two channels are provided on the outer surface of the piston between the end wall and the ring, suitable to place the end wall in communication with the annular seat of the ring for metal to flow under the same ring. In this way, the metal flowing into the ring seat solidifies to create a continuous thickening that radially pushes the ring outwards, gradually compensating for its wear, by adapting it to any deformations of the piston container and thus protecting the latter.

WO201315682A1 describes a piston for cold chamber die casting machines comprising a piston body terminating frontally with a front surface for pushing molten metal and at least one ring seat formed around said body and suitable for housing a respective sealing ring. In an intermediate annular portion of the bottom surface of the ring seat, an annular distribution channel is made, communicating with the front surface of the piston through at least two communication holes made in the piston body for a molten metal to flow into the distribution channel under the ring. These communication holes are inclined with respect to the piston axis and have an increasing cross-section of passage to the distribution channel.

SUMMARY OF THE INVENTION

The object of the present invention is to propose a piston head for a die casting machine of the type described in the aforementioned patent documents but capable of providing further improved performance.

This object is achieved by a head according to claim 1 and a piston according to claim 10.

BRIEF DESCRIPTION OF DRAWINGS

The features and advantages of the piston head according to the present invention will be apparent from the following description, given by way of non-limiting example, of the preferred embodiments thereof according to the accompanying drawings. In said drawings:

FIG. 1 is a side view of the end portion of a piston according to the invention in a first embodiment;

FIG. 2 is an axial sectional view along the line A-A of the piston portion of FIG. 1;

FIG. 5 is an axial sectional view along the line B-B of the piston head of FIG. 4;

FIG. 5a is an enlarged view of the detail "C" shown in FIG. 5;

FIG. 7 is an axial sectional view along the line G-G of the piston head of FIGS. 6 and 6a;

FIG. 14 is a perspective view of the head of FIGS. 12 and 13, but provided with a copper alloy insert;

FIG. 14a is an axial sectional view of the head of FIG. 14 provided with a sealing ring;

FIG. 18 shows the head of FIG. 16 provided with a sealing ring;

FIG. 18a is an enlarged view of the detail D circled in FIG. 18; and

FIG. 19 is an axial sectional view along the line C-C of the head of FIG. 18.

Figure 3:
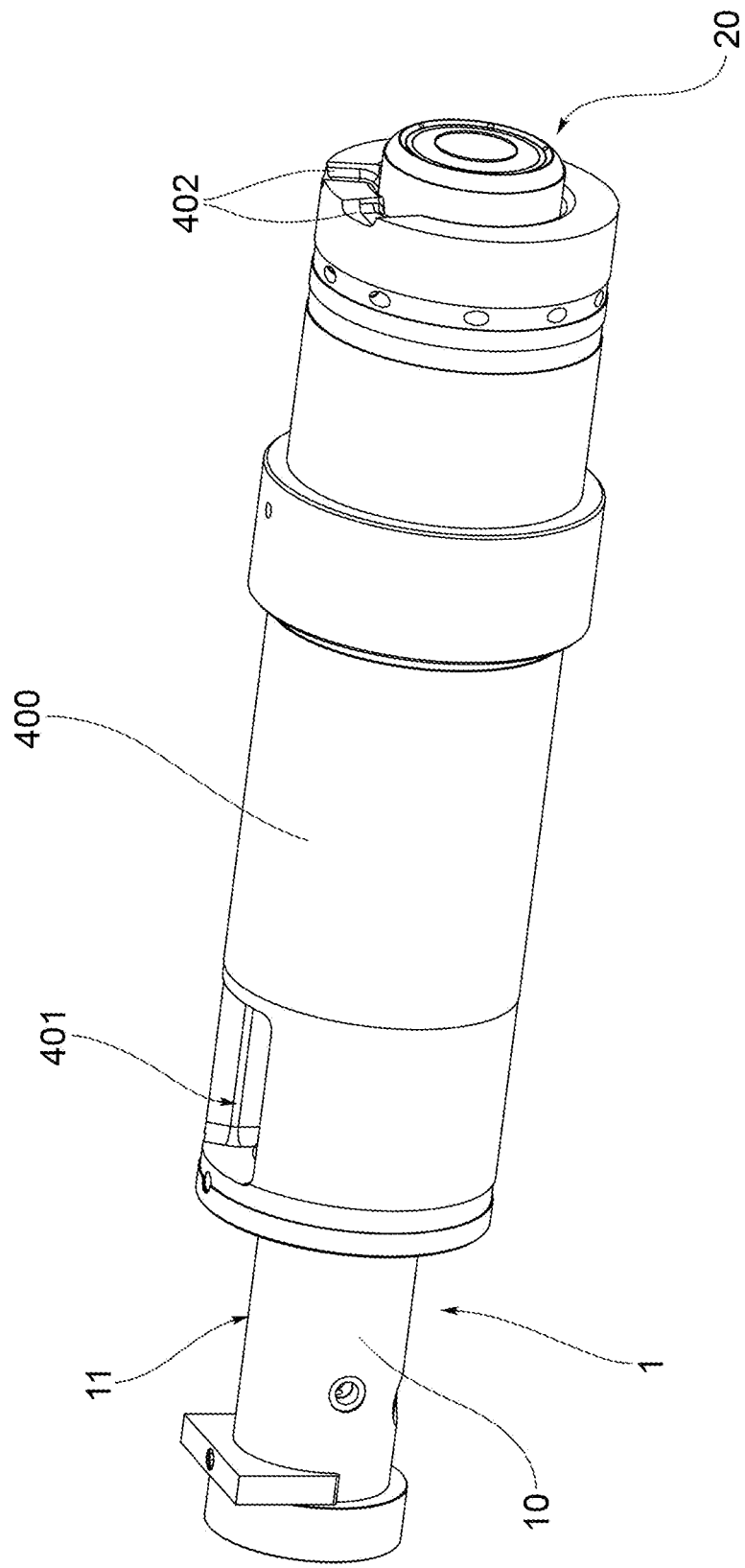
FIG. 3 is a perspective view of the piston inserted into a container of a press of a die casting machine.

In the following description, elements common to the various embodiments of the invention are indicated at the same numeric references.

Moreover, unless expressly indicated otherwise, elements described for one embodiment of a piston head may also be present, possibly adapted as required, in other described embodiments of a piston head.

DETAILED DESCRIPTION

With reference to the accompanying figures, a piston of a press of a die casting machine, in particular of the cold chamber type, is indicated at 1. The press comprises a container 400 wherein the piston 1 is slidably housed. The container 400 has, in its upper part and at its end, a loading hole 401 for molten metal, for example, aluminum. At the end opposite to said loading hole 401, the container 400 has slits 402 to which correspond starting points of casting branches that flow into a die. The piston 1 is thus axially slidable inside the container 400 to push the metal fed through the loading hole into the casting branches and then into the die.

In the following description, the equivalent terms "rear" and "proximal" and the equivalent terms "front", "frontal" and "distal" are used with reference to the direction of advancement of the piston and the related head in the container 400 towards the casting branches 402.

The piston 1 comprises a stem 10 extending between a proximal end 11, i.e. at the rear, and a distal end 12, i.e. at the front, along a piston axis Y.

Piston 1 ends with a piston head 20; 200. FIGS. 1 and 2 represent an end portion of the piston 1 provided with the piston head 20.

The head 20; 200 is delimited frontally by a front surface 22; 222 for pushing the molten metal.

Furthermore, the head 20; 200 has a lateral wall 24, for example a cylindrical wall, which extends around a head axis X.

On the head 20; 200 is mounted at least one sealing ring 16, for example made of copper alloy.

The sealing ring 16 is housed in a respective ring seat 18 having an annular extension made in the side wall. The ring seat 18 is delimited by a bottom surface 19 and by at least one rear annular abutment shoulder 26.

In one embodiment, the ring seat 18 is made in a rearward position with respect to the front surface 22; 222 of the head 20 and is delimited by a rear shoulder 26 and a front shoulder 28. In other words, the bottom surface 19 of the ring seat 18 is lowered relative to the outer cylindrical surface of the head 20; 200.

In one embodiment, the sealing ring 16 is of the type having a longitudinal slit 17, preferably in the shape of a step, so as to be able to widen elastically during assembly on the body 11 and, during use, when pushed radially by the molten metal flowing beneath it. The step-like shape of the longitudinal slit 17 also allows the passage of the molten metal at said slit to be restricted, allowing an optimum pressure seal.

In one embodiment, a distribution channel 30 is made in an intermediate annular portion 19a of the bottom surface 19 of the ring seat 18. This distribution channel 30 has an annular extension, i.e., it extends coaxially to the head axis X. In other words, the distribution channel 30 defines a bottom channel surface further lowered with respect to a rear annular portion 19b and a front annular portion 19c of the bottom surface 19 of the ring seat 18.

In one embodiment illustrated in FIGS. 4-11 and 16-19, the ring seat 18, and in particular, where provided, the distribution channel 30 communicate with the front surface 22 of the head through connection holes 32 made in the head 20. For example, in the head 20, six connection holes 32 are made, angularly equidistant from each other.

Such connection holes 32 allow molten metal to flow into the ring seat 18 and then under the ring 16 to obtain the effect of compensating the wear of the ring by forming subsequent annular layers of metal that solidify under the ring 16. Such solidified metal layers push the ring outward radially, compensating for its progressive thinning.

It should be noted that the connection holes 32 are completely formed within the body of the head 20 between an inlet opening 32' for the molten metal, formed in the front surface 22 of the head, and an outlet opening 32" for the molten metal, formed in or facing the bottom surface 19 of the ring seat 18.

In one embodiment, the connection holes 32 are inclined with respect to the head axis X. For example, the connection holes 32 form an angle of about 30° with the head axis X.

In one embodiment, the connection holes 32 have an increasing cross-section of passage to the ring seat 18, i.e. they have a conical shape. For example, the solid angle defined by the connection holes 32 is about 10°.

In one embodiment, the outlet openings 32" of the connection holes 32 are formed in the front annular portion 19c of the bottom surface 19 and are open toward the annular distribution channel 30. This annular front portion 19c is then interrupted by the outlet openings 32" of the connection holes 32.

Figure 4:
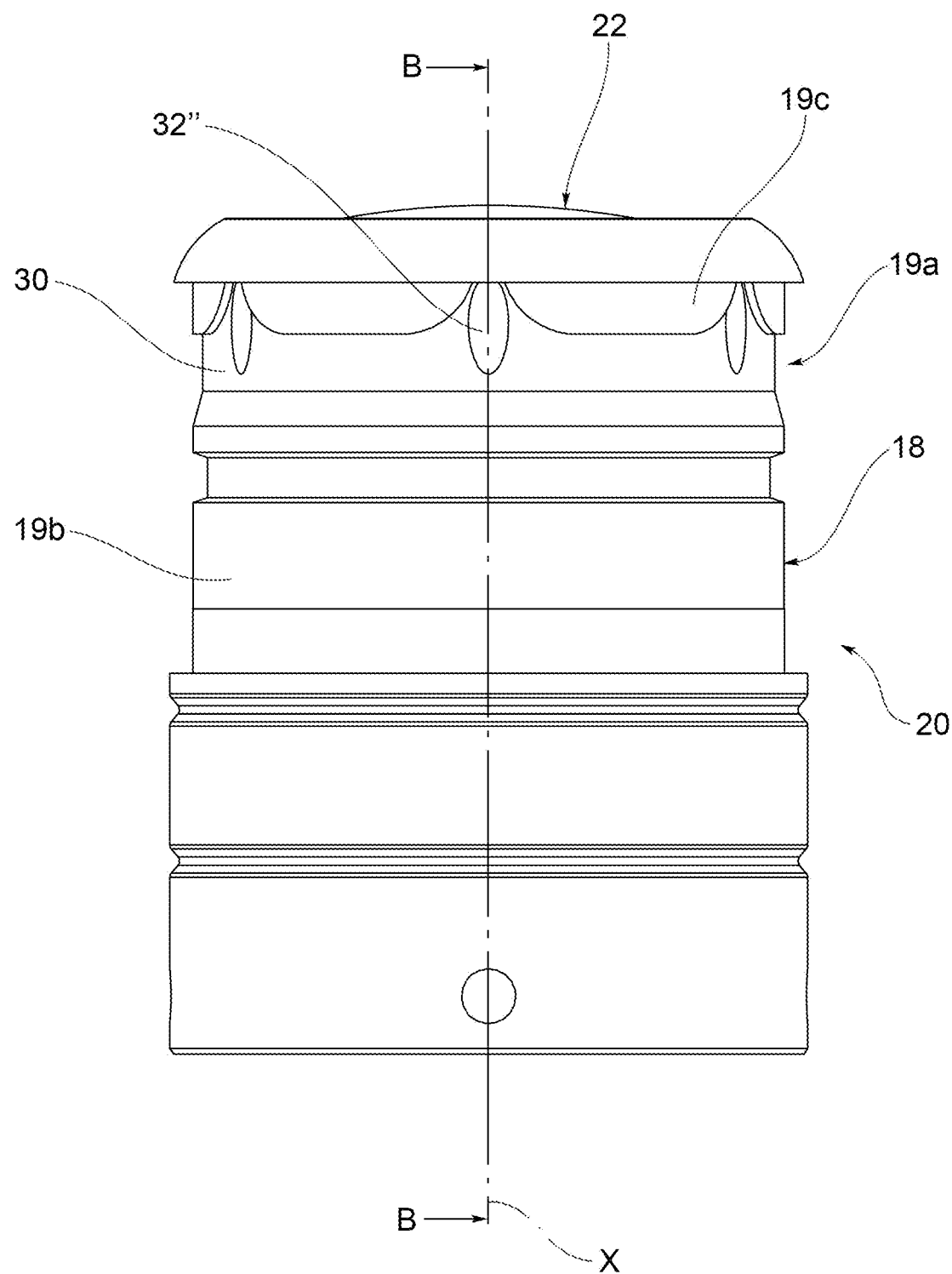
FIG. 4 is an elevation view of only the piston head of FIGS. 1 and 2, without the sealing ring.
Figure 6A:
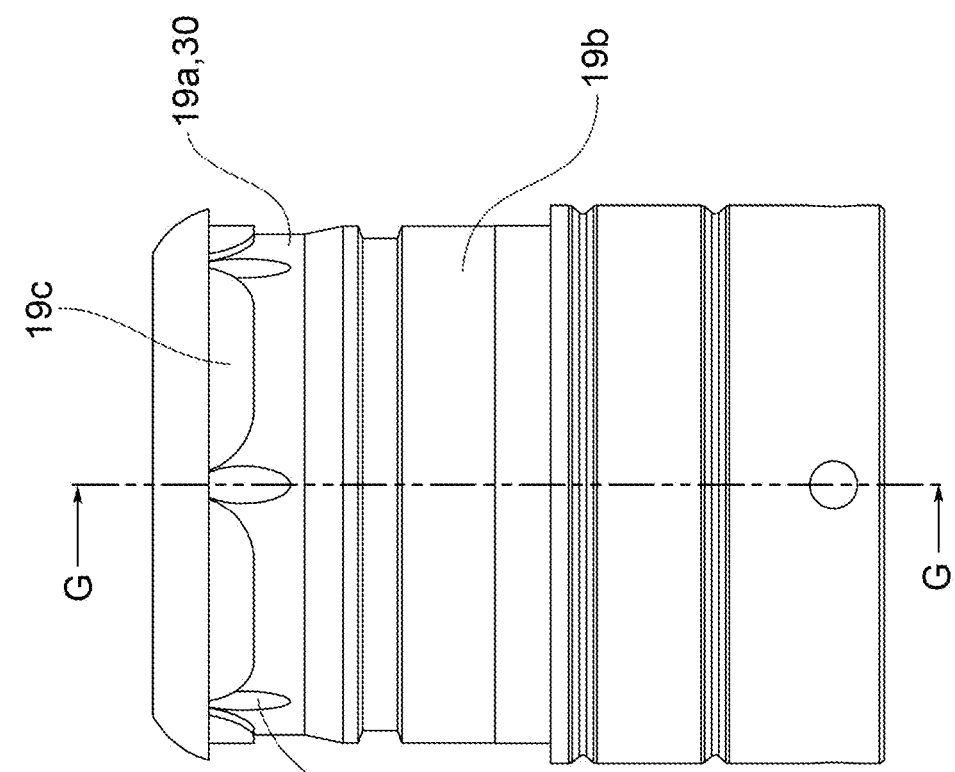
FIGS. 6 and 6a show, in perspective view and in elevation view, a piston head in a variant of embodiment.
Figure 6:
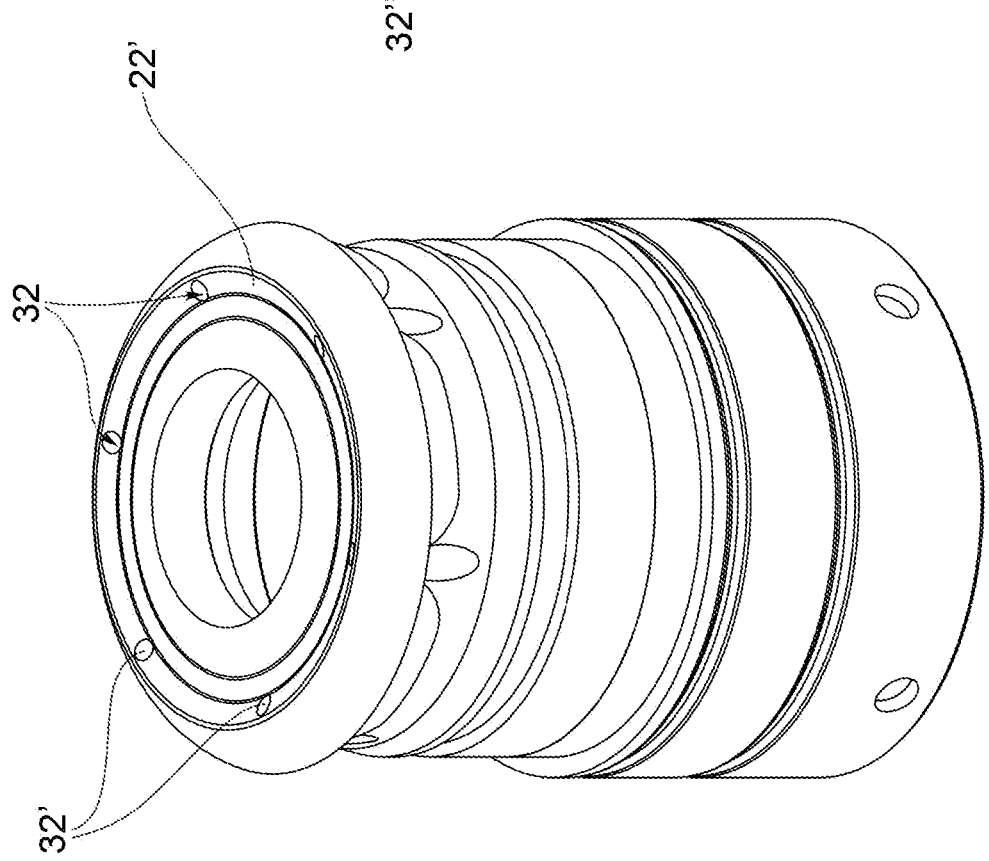
Figure 7:
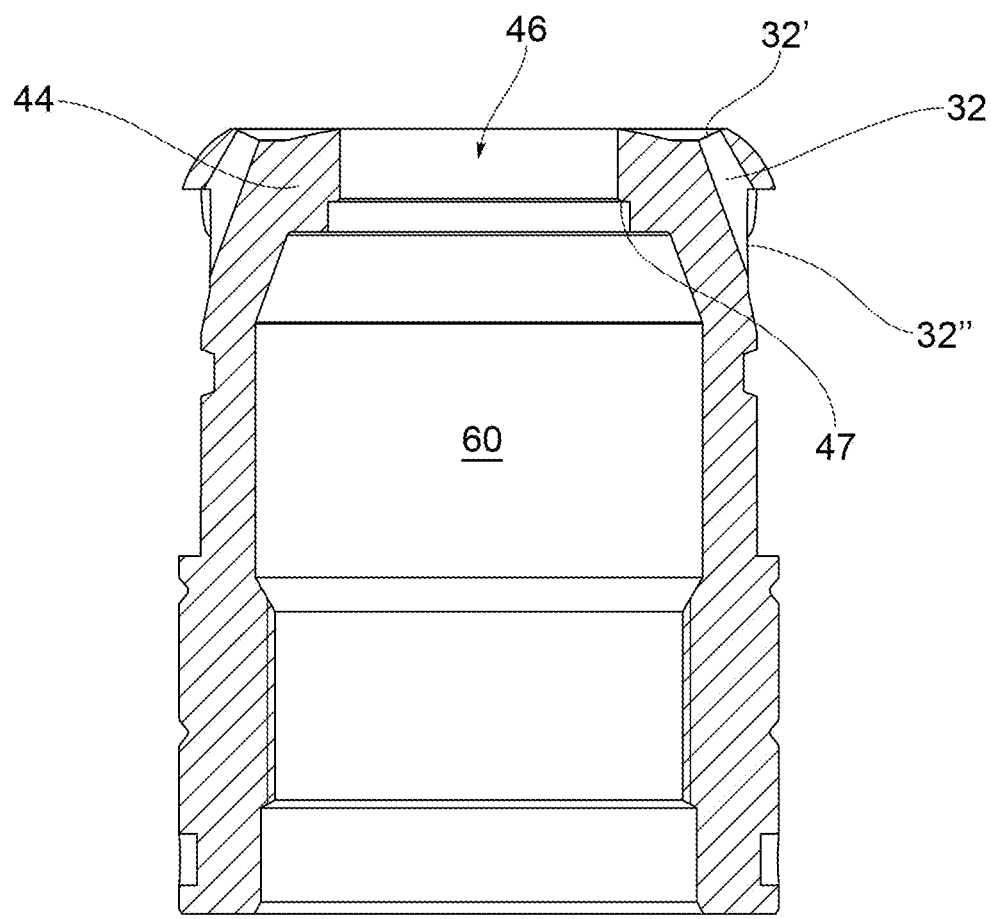
Figures 8, 8A:
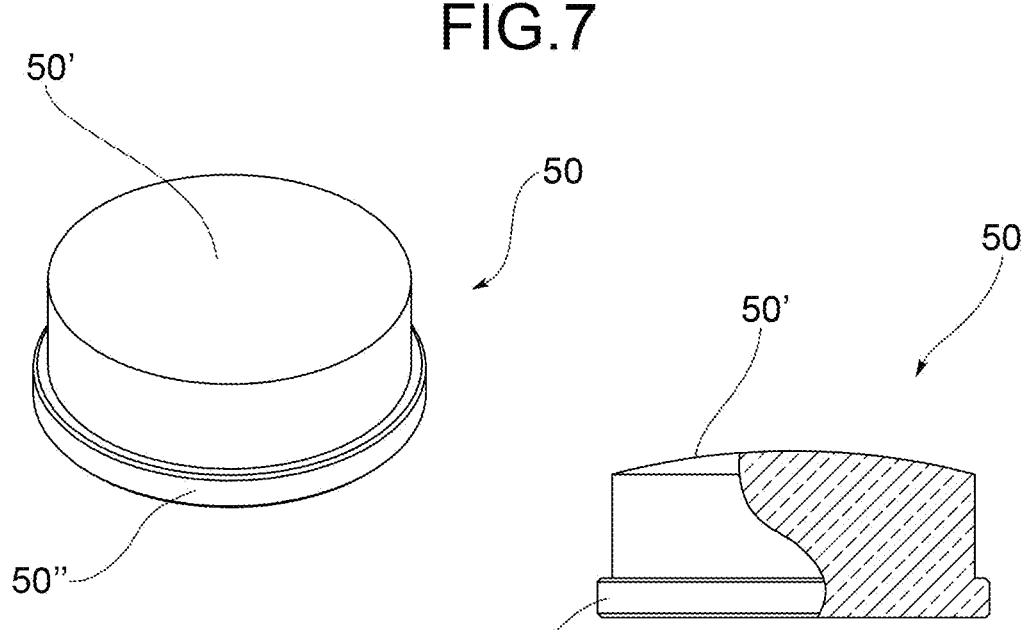
FIGS. 8 and 8a show, in a perspective view and in a partial axial sectional view, a copper alloy insert to be used with the piston head of FIG. 6.
Figure 9A:
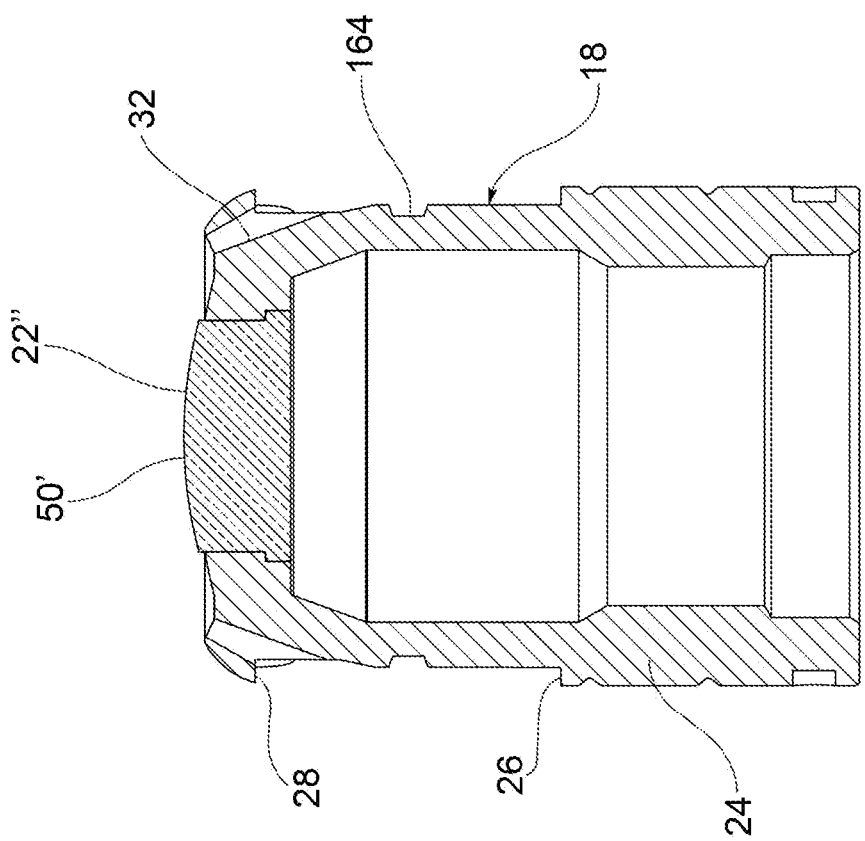
FIGS. 9 and 9a show, in perspective view and in axial sectional view, the piston head of FIG. 6 provided with the copper alloy insert of FIG. 8.
Figure 9:
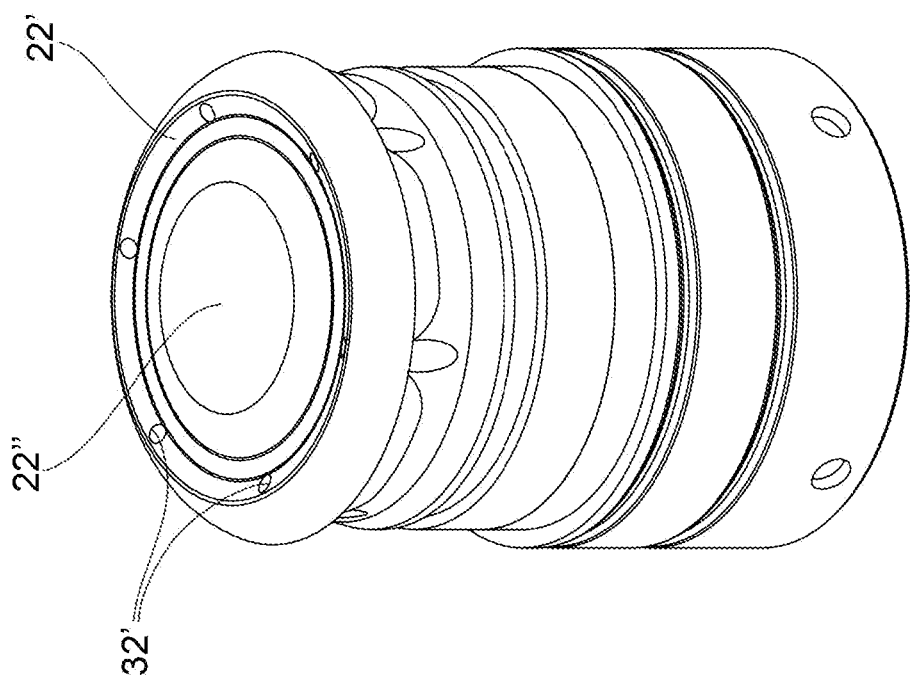
Figure 10:
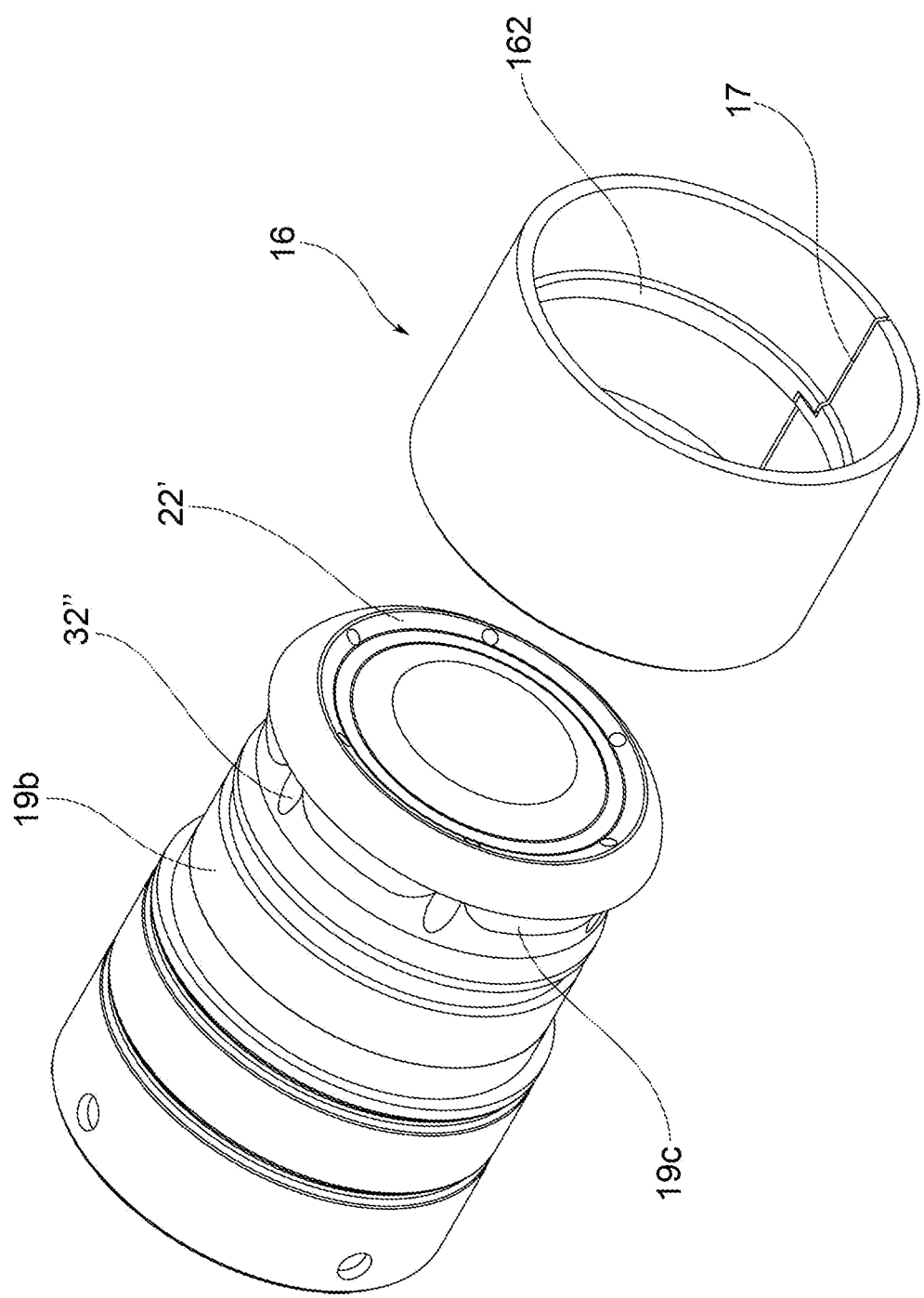
FIG. 10 is an exploded perspective view of the head of FIG. 9 and a related sealing ring.
Figure 11:
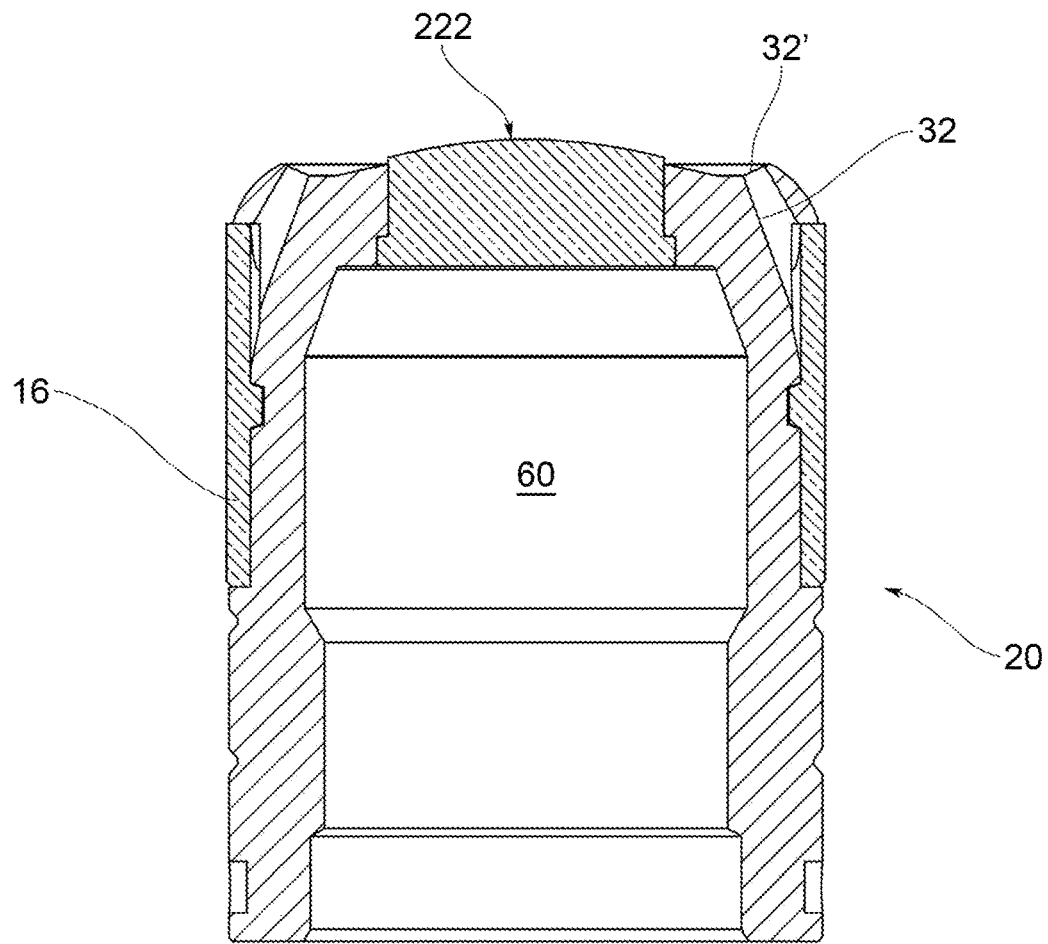
FIG. 11 is an axial sectional view of the piston head provided with a sealing ring.
Figure 11A:
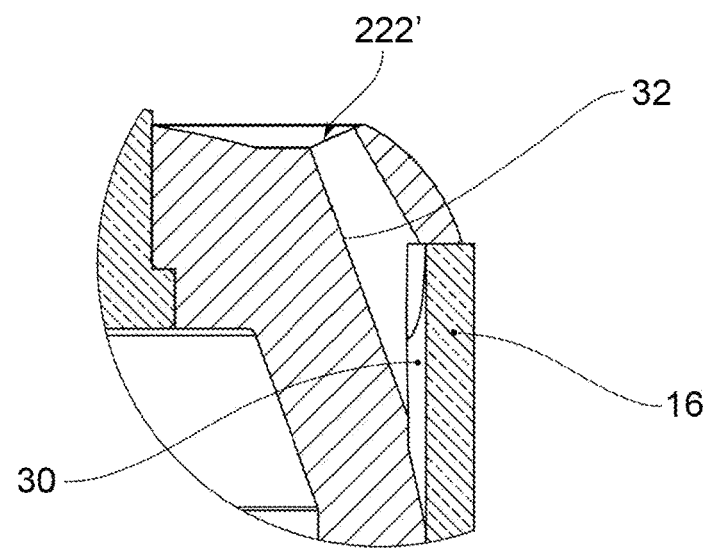
FIG. 11a is an enlarged view of the detail "M" shown in FIG. 11.

More specifically, at each outlet opening 32", the front annular portion 19c forms a recess facing towards the front abutment shoulder 28, e.g. in the form of a cusp, as illustrated for example in FIG. 4. Thus, each outlet opening 32" extends over a coplanar outlet surface to the bottom surface of the distribution channel 30.

Figure 12:
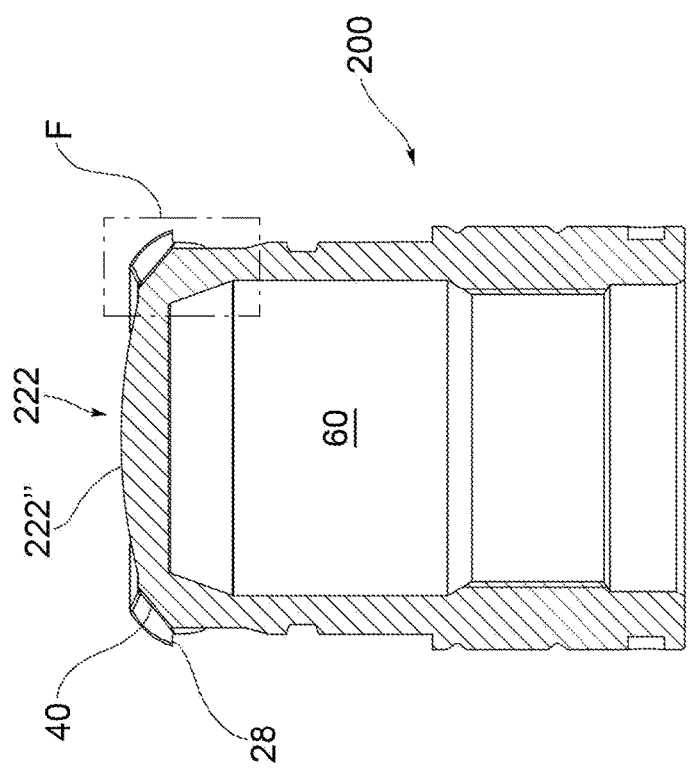
FIG. 12 is an elevation view of a piston head in a variant of embodiment.
Figure 13A:
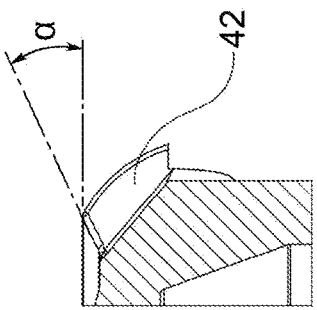
FIG. 13a is an enlarged view of the detail "F" shown in FIG. 13.
Figure 13:
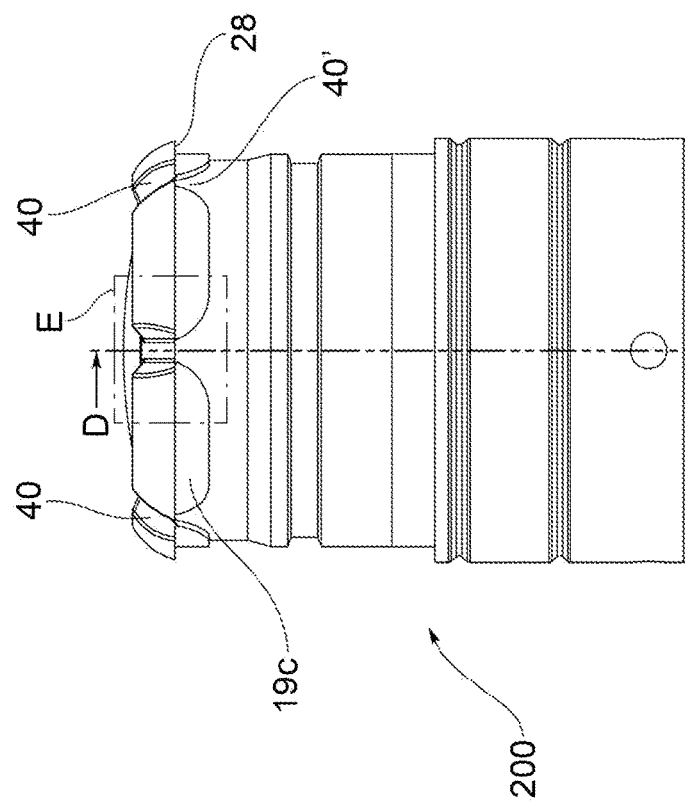
FIG. 13 is an axial sectional view along the line D-D of FIG. 12.
Figure 12A:
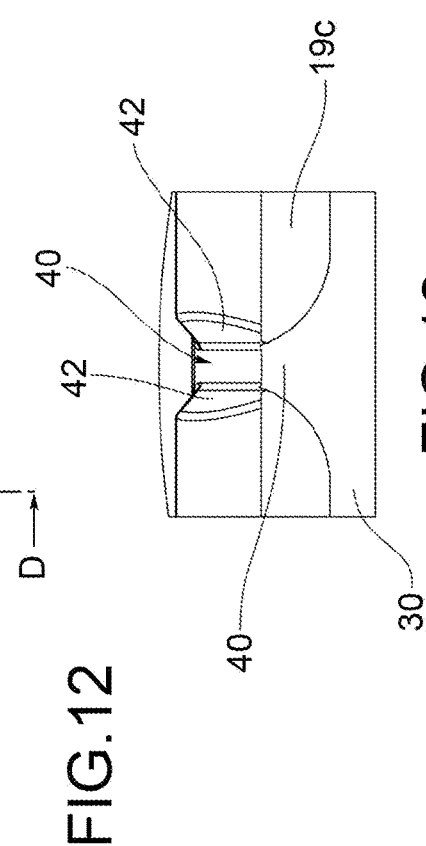
FIG. 12a is an enlarged view of the detail "E" shown in FIG. 12.

In one variant of embodiment illustrated in FIGS. 12-14, the ring seat 18 communicates with the front surface 222 through the connection channels 40.

Unlike the connection holes 32, the connection channels 40 are open radially.

In one embodiment, in the piston head 200, six connection channels 40 are made, angularly equidistant from each other.

In one embodiment, the connection channels 40 are made in the head portion between the front surface 222 and the front abutment shoulder 28 of the ring seat 18.

In one embodiment, each connection channel 40 is delimited by two channel walls 42 inclined with respect to a vertical plane orthogonal to the bottom surface of the connection channel. For example, the inclination of the channel walls 42 forms, with such vertical plane, an angle between 5° and 55°. Such radial opening of the channels 40 facilitates the removal of the metal that has solidified in the same channels.

In one embodiment, the connection channels 40 flow into a ring seat 18 having the same shape as described above for the head embodiment with the connection holes 32. In particular, each connection channel 40 flows to a respective cusp-shaped recess 40' formed in the front portion 19c of the bottom surface 19 of the ring seat 18

Therefore, the molten metal, pushed by the front surface 22; 222 of the piston head, penetrates into the holes 32 or the connection channels 40 and, following a straight path, reaches the ring seat 18 and in particular, where provided, the distribution channel 30. Since such channel is not engaged by the sealing ring 16, which instead rests on the rear annular portions 19b and the front annular portions 19c of the bottom surface 19 of the ring seat 18, the metal still in the liquid state is free to expand circumferentially in the distribution channel 30, i.e. it is free to uniformly occupy the entire annular extension of said channel 24.

This uniform distribution of the metal in the distribution channel 30 is encouraged by the radial and diverging connecting walls of the recesses of the front annular portion 19c between which the connection holes 32 or the connection channels 40 flow.

In one embodiment, the sealing ring 16 and the ring seat 18 have interlocking coupling portions 162, 164, i.e.

complementary to each other, which form a kind of labyrinth, which restricts the metal in the liquid state that has penetrated under the sealing ring 16—and in the cooling and solidifying stage—from reaching the portion of the ring seat 18 between said interlocking coupling portions and the rear abutment shoulder 26. In fact, in such rearward portion of the ring seat 18 and in some piston embodiments—not shown—ducts of a lubrication circuit may flow, suitable to carry a lubricating fluid around the piston head through the ring seat 18.

In one embodiment, said interlocking coupling portions comprise at least one annular rib 162 extending from the inner surface of the sealing ring 16 and a corresponding annular groove 164 made in the ring seat 18.

In accordance with an aspect of the invention, the holes 32 or connection channels 40 flow into an annular peripheral portion 22'; 222' of the front surface 22; 222 of the piston head 20; 200. This peripheral portion 22'; 222' is inclined with respect to a frontal plane orthogonal to the head axis X so as to be directed towards said head axis X.

In other words, the normal of such annular peripheral portion, which points in the direction opposite to that of the metal flow into the holes or connection channels, converges towards the head axis X.

In one embodiment, the inclination of the annular peripheral portion 22'; 222' forms an angle α between 10° and 55°, preferably between 20° and 30° and even more preferably 25°.

Figure 15A:
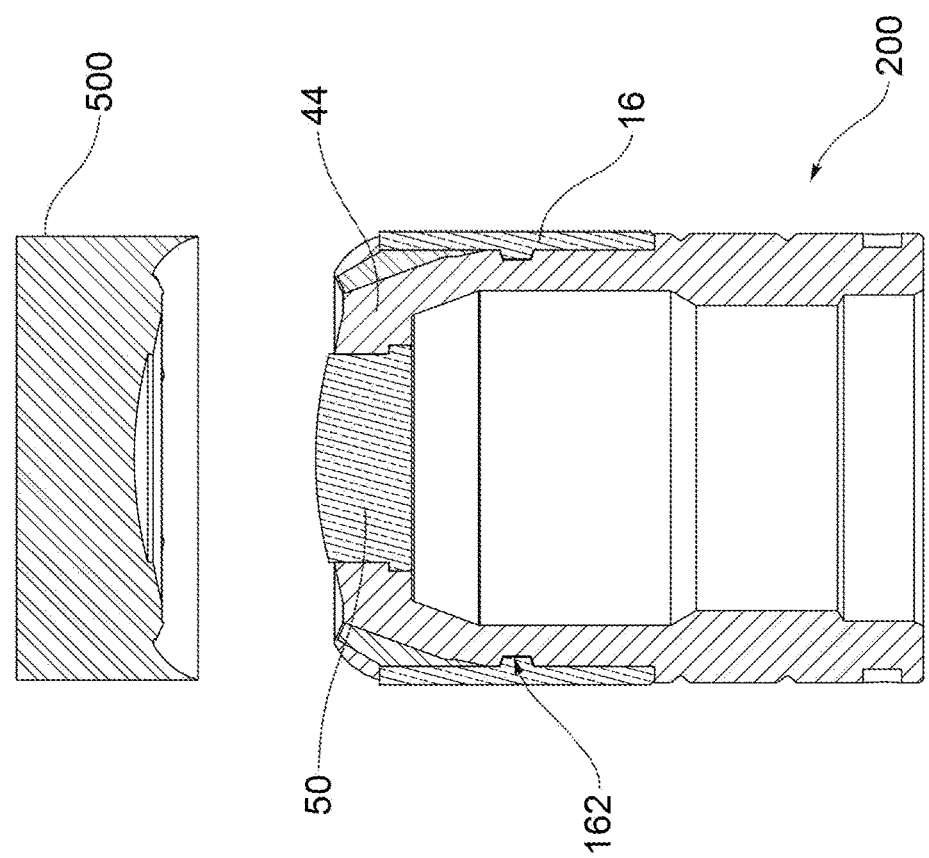
FIGS. 15 and 15a show, in axial sectional view, the piston head of FIG. 11 after a working cycle, with the metallic sprue still attached to it and with the sprue detached, respectively.
Figure 15:
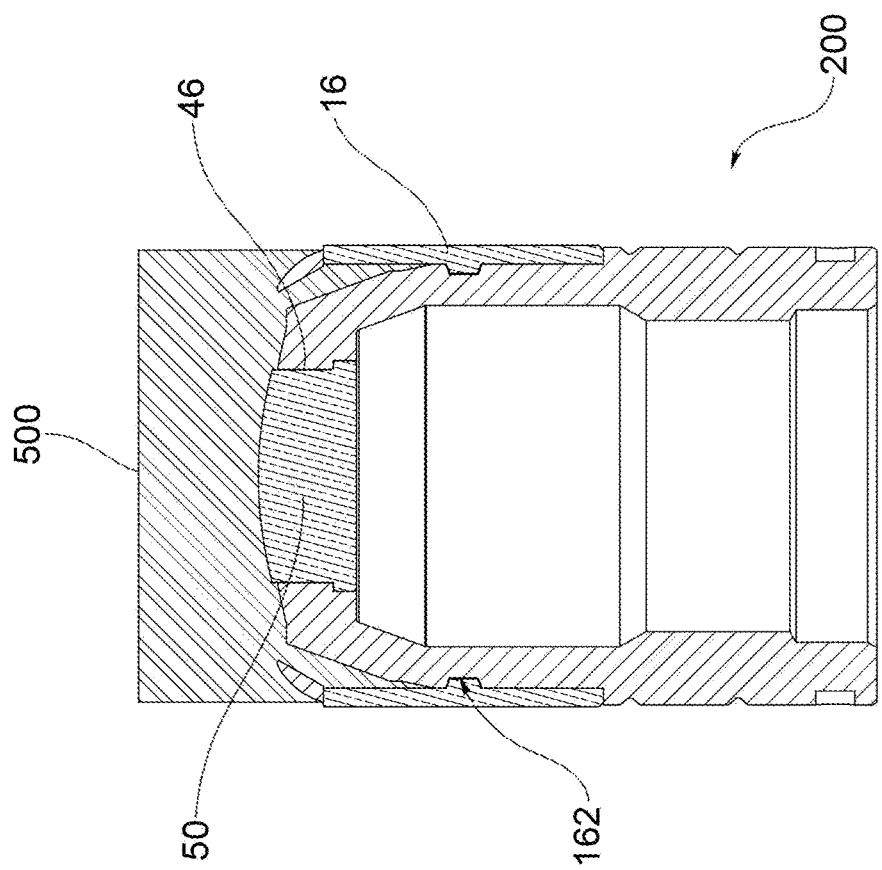
Figure 17:
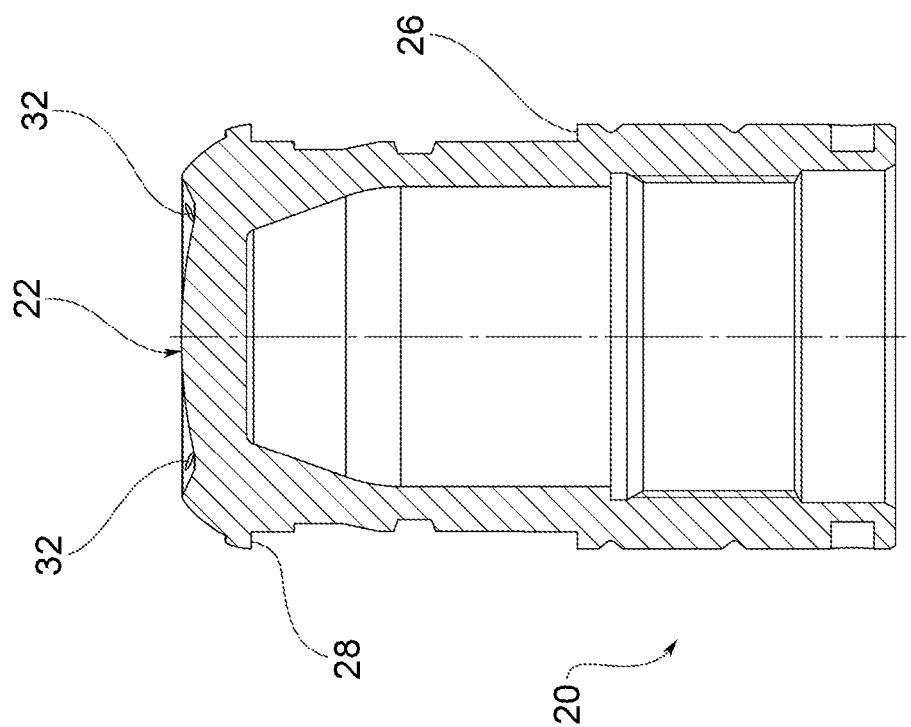
FIG. 17 is an axial sectional view along the line A-A of the piston head of FIG. 16.
Figure 16:
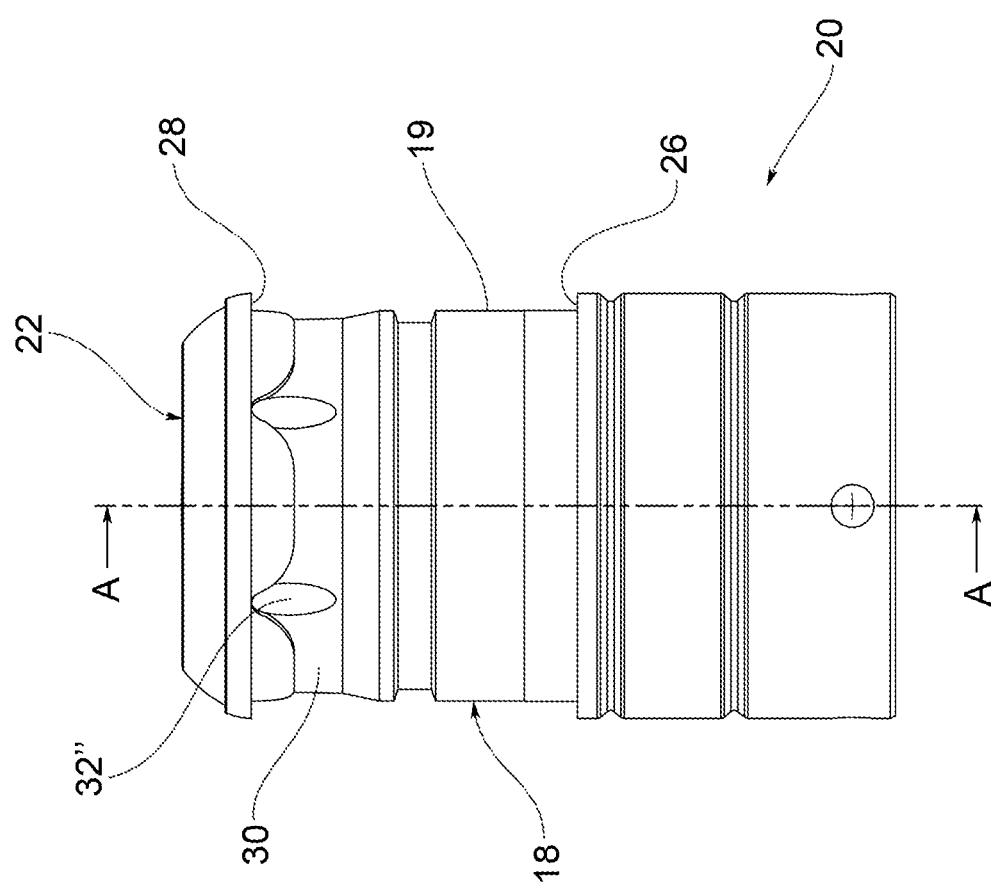
FIG. 16 is an elevation view of the piston head in accordance with a further variant of embodiment without a sealing ring.

FIGS. 15 and 15a show how the shape of the piston head 20; 200 determines the shape of the metal sprue 500 which remains attached to the front surface 22; 222 of the head 20; 200 when the metal solidifies at the end of the pushing stage of the piston, and how such shape of the head facilitates the detachment of the sprue 500.

During expulsion of the sprue from the container (FIGS. 15 and 15a) due to the presence of the undercut made by the inclined annular peripheral portion 22'; 222' because of the decrease in temperature and therefore the contraction of the sprue, the vibrations that are created by the movement of the piston and the front wall of the container during the accompanying stage of the sprue, and the force exerted by the machine, the metallic sprue 500 breaks off precisely at the desired points, i.e., at the inlet opening of the holes 32 or the connection channels (FIG. 15a).

Moreover, in one embodiment, the annular peripheral portion 22'; 222' delimits a central convex portion 22", 222" of the front surface of the head.

The rupture effect of the metallic sprue 500 at the inlet opening of the holes 32 or the connection channels 40 is further amplified by the convex shape of the central portion 22"; 222" of the front surface of the piston head.

Moreover, in the case of connection holes 32, the inclination of the annular peripheral portion also allows a perfectly circular hole shape to be obtained instead of an oval shape as occurs with an orthogonal surface at the head axis X.

According to one embodiment, the piston head 20; 200 comprises a front wall 44 which delimits an insert seat 46 open at least at the front. In this insert seat, a copper alloy insert 50 is housed.

This copper alloy insert 50 allows the improvement of the thermal exchange between the alloy of which the sprue is formed and the cooling fluid that is circulated in the piston. Due to this insert 50, which has a higher thermal conductivity than steel, the sprue cools faster, thus avoiding bursting, reducing cycle times, and also reducing the piston temperature.

The copper alloy insert 50 replaces the central part of the front wall of the piston head, i.e., the part most subject to ruptures due to cracks from thermal and work fatigue. Consequently, the piston has a longer life. The insert, furthermore, may also be replaced when worn.

In accordance with one embodiment, the copper alloy insert 50 forms a convex front insert surface 50'.

In one embodiment, the piston head 20; 200 has a hollow body. The head comprises a front wall 44, which, with the side wall 24, delimits a head cavity 60 suitable to receive the front portion of a head support pin (70).

In one embodiment, the insert seat 46 is open at the rear, so that the copper alloy insert 50 rests against the front end of the head support pin 70 and therefore cannot retract during use.

In one embodiment, an undercut 47 is made in the side wall delimiting the insert seat 46, which engages axially an annular relief 50" made in the rear part of the insert 50. The interaction between the undercut and the annular relief prevents the insert from slipping off frontally.

In one embodiment illustrated in FIGS. 1 and 2, the piston head is mounted on the stem 10, for example, by screwing.

More precisely, the head support pin 70 is fixed, for example by screwing, on the distal end of the stem 10. This head support pin has a distal end portion 70' that is inserted into the cavity 60 of the head. For example, a rear portion of the side wall 24 of the head is threaded for screwing on such distal portion 70' of the head support pin 70.

In one embodiment, the head support pin 70, with the cavity of the head, delimits a cooling chamber 80. The stem 10 is axially crossed by a duct 122 suitable to transport a cooling liquid inside the chamber 80.

FIGS. 16-19 illustrate a piston head 20 in a further variant of embodiment, which differs from the embodiments previously described by a particular configuration of the head end portion 23 that connects the front surface 22 to the front shoulder 28 which delimits the ring seat 18.

In fact, in accordance with an aspect of the invention, said head end portion 23 is generally convex with a gradual decreasing diameter toward the front surface 22, except in at least one intermediate zone of radial discontinuity 232 wherein the diameter of the head end portion 23 is abruptly reduced to form at least one annular wall 234 predominantly facing the front wall 22.

In the illustrated embodiment, such annular wall 234 is substantially orthogonal to the head axis X and forms therefore a step that interrupts the outer surface of the head end portion 23 dividing it into two axially consecutive convex annular surfaces 23a, 23b, front and rear respectively.

In a variant of embodiment, such annular wall 234 is inclined so as to converge toward the head axis X in the opposite direction to that of the piston feed.

In one embodiment, the annular wall 234 is closer to the rear shoulder 28 than to the front surface 22.

In one embodiment, the two convex annular surfaces 23a, 23b are spherical cap portions.

Preferably, the two convex annular surfaces 23a, 23b have a different radius of curvature. For example, the rear surface 23b has a smaller radius of curvature.

Preferably, moreover, the rear surface 23b terminates at the rear forming a tangent substantially parallel to the head axis X.

In one embodiment, the presence of step discontinuity in the head end portion 23 involves a slight, but significant, increase in the height of the front shoulder 28 relative to the shoulder made in a head devoid of this step discontinuity. In other words, the diameter of the head end portion 23, near the ring seat 18, is greater than the diameter of a head according to the prior art.

As a result of this increased diameter, the gap between the head end portion 23 near the front shoulder 28 and the inner surface of the container wherein the piston head slides is further reduced.

The configuration of the discontinuous profile of the head end portion 23 allows the flow of liquid metal to the sealing ring 16 to be slowed down and reduced. The sealing ring is therefore more protected and is subjected to less wear.

In fact, it has been found that, in the stage of pushing the metal in the liquid state, the annular wall 234, in opposition to the flow of the metal, causes in such flow a turbulence that obstructs the passage of the metal towards the sealing ring. The slowing of the flow of metal in the liquid state also causes a faster cooling and therefore solidification before the metal can creep into the seat of the sealing ring.

In addition, the presence of the radial discontinuity zone, and in particular the related increase in the diameter of the piston head near the front shoulder 28, further facilitates the detachment of the metallic sprue 500 from the piston head. In fact, the solidified metal wedge surrounding the head end portion is thinner than with a head according to the prior art. As mentioned above, furthermore, the end of said wedge fails to creep, and therefore engage, in the gap between the sealing ring and the front shoulder 28.

Moreover, due to the constriction because of the cooling of the solidified metal, the same metal exerts a force on the piston head due to the discontinuity present in the end portion of the head 23; the solidified metal also has an abrupt section variation that generates various components of such force, one of which contributes to pushing and disengaging the metal sprue from the piston.

Although this piston head with an end portion with a discontinuous surface has been represented as a variant of embodiment of the head 20 of FIG. 4, it should be noted that such end portion 23 may be present either in a head with holes 32 or in a head with channels 40, and is not necessarily tied to the shape of the front wall 22; 222 or to the presence of the copper insert 50 or other geometric or structural features of the piston head or the piston.

The invention thus conceived therefore achieves the predefined objectives.

Clearly, a person skilled in the art, in order to satisfy contingent and specific requirements, may make further modifications and variations to the head and to the piston according to the present invention, all of which are in the scope of protection of the invention, as defined by the following claims.

The invention claimed is:

1. Piston head for a die-casting machine of a cold chamber type, where said machine comprises a press with a container in which a piston is slidably housed, comprising a front surface for pushing molten metal and a side wall that extends around a head axis, wherein said side wall is formed at least one ring seat suitable to receive a sealing ring to create a seal on the wall of said container of the press, in which the bottom of the ring seat is connected with said front surface through holes or channels for connection to a metal flow under the sealing ring, the head being characterized in that said holes or connection channels open into an annular peripheral portion of said front surface, said annular peripheral portion being inclined with respect to a frontal plane orthogonal to said head axis in such a way to be facing towards said head axis.

2. Head according to claim 1, wherein the normal of said annular peripheral portion, in the direction opposite to that of metal flow in the holes or connection channels, converges towards the head axis.

3. Head according to claim 1, wherein said inclination forms an angle comprised between 10° and 55°.

4. Head according to claim 1, wherein said annular peripheral portion delimits a central portion of the front surface of the head, said central portion being convex.

5. Head according to claim 1, comprising a front wall that delimits an insert seat open at least at frontally, in which a copper alloy insert is inserted.

6. Head according to claim 5, wherein said copper alloy insert forms a convex front insert surface.

7. Head according to claim 1, comprising a front wall that, with the side wall, delimits a head cavity suitable to receive the front portion of a head support pin.

8. Head according to claim 5, wherein said insert seat is open at the rear in such a way that the copper alloy insert rests against the front end of the head support pin.

9. Head according to claim 5, wherein, in the front wall that delimits the insert seat is formed an undercut in which it axially engages an annular relief formed in the rear part of the copper alloy insert.

10. Head according to claim 1, wherein the ring seat is in a rearward position with respect to the front surface of the head and is delimited by a rear shoulder and a front shoulder, the head comprising a head end portion which connects the front surface to the front shoulder, and wherein said head end portion is convex with a diameter decreasing toward the front surface except in at least one intermediate zone of radial discontinuity wherein the diameter of the head end portion is abruptly reduced to form at least one annular wall predominantly facing toward the front surface.

11. Head according to claim 1, wherein said annular wall is substantially orthogonal to the head axis and forms a step that interrupts the outer surface of the head end portion dividing it into two convex annular surfaces, front and rear respectively.

12. Piston for a die-casting machine of the cold chamber type, where said machine comprises a press with a container in which the piston is slidably housed, the piston comprising a stem and a piston head according to claim 1 assembled on a distal end of said stem.

13. Piston according to claim 12, wherein the distal end of the stem is fixed to the piston head by screwing, a head support pin, said head support pin having a distal end portion that is inserted by screwing, in a cavity of the piston head.

14. Piston according to claim 13, wherein the head support pin, with the head cavity, delimits a cooling chamber communicating with a duct formed in the stem and suitable for transporting a cooling liquid inside said cooling chamber.

* * * * *